United States Patent

Dorman

[15] 3,648,517

[45] Mar. 14, 1972

[54] CONTROL APPARATUS FOR MASS FLOW METER

[72] Inventor: Frank D. Dorman, St. Paul, Minn.

[73] Assignee: Thermo-Systems Inc., St. Paul, Minn.

[22] Filed: Nov. 25, 1970

[21] Appl. No.: 92,571

[52] U.S. Cl. .................................................73/194 F
[51] Int. Cl. .................................................G01f 1/00
[58] Field of Search ........................73/194 E, 194 A, 194 F

[56] References Cited

UNITED STATES PATENTS 3,188,862  6/1965  Roth ....................................73/194 A
3,470,741  10/1969  Durbin ................................73/194 F

*Primary Examiner*—Charles A. Ruehl
*Attorney*—Burd, Braddock & Bartz

[57] ABSTRACT

A control system for the power supply in a mass flow meter, the flow meter having an ionizing electrode and an ion collecting electrode producing first and second currents, to maintain a constant ratio between the electrical potential across and the current flow between the ionizing source and the ion collector, so that the differential of the first and second collector currents is directly indicative of mass flow in the flow meter.

7 Claims, 2 Drawing Figures

Patented March 14, 1972

3,648,517

INVENTOR.
FRANK D. DORMAN
BY
Burd, Braddock & Barty
ATTORNEYS

CONTROL APPARATUS FOR MASS FLOW METER

BACKGROUND OF THE INVENTION

The art of measuring the mass flow of fluids by measuring the deflection of a beam of ions transmitted transversely across the moving fluid stream is taught by the U.S. Pat. to E. J. Durbin, No. 3,470,741.

This patent teaches that a stream of ions is transmitted from an ion source transversely across a fluid flow path to establish a reference current flow in a pair of ion collector terminations, one associated with the upstream area of the ion collector and the other associated with the downstream area of the collector. The current flow from the terminations in the presence of the reference flow, which is typically a zero flow, is connected with a balancing bridge network which is balanced with the reference current flows from each termination. In the presence of mass flow to be measured, the deflection of the ions impinging over an area on the ion collector is characterized by the deflection or displacement of the median ion in the impinging area.

In the apparatus taught by the Durbin patent, this deflection of the median ion causes a variation in the current flows from the terminations associated with the upstream and the downstream side of the collector. These variations in the current flows in the two terminations imbalance the bridge network causing an indicator to vary from a zero balanced position.

To determine the mass flow causing the deflection of the median ion in the area of impingement on the collector, the bridge is again balanced by adjusting the various resistances in the arms of the bridge network so that the indicator again represents a balanced bridge condition. The amount of change required in the resistances in the arms of the bridge network to achieve a balanced bridge is representative of the mass flow. This requirement of constantly rebalancing the bridge circuit in order to determine the mass flow in the fluid path requires complicated adjustment equipment as well as a time delay while the adjustment is completed after each variation in the mass flow.

It is desirable to provide a control circuit in a mass flow meter so that mass flow variations are directly represented by the differential in the output currents from the ion collector. This would provide essentially instantaneous readings of mass flow variations. It is known that the differential current output from a mass flow meter is a true measure of mass flow where the ratio of total current to voltage between the ion source and the ion collector is maintained constant. This result is accomplished by the provision of a power supply and control system for generating the ion field which produces a constant voltage to current ratio across the gap between the ion source and ion collector. Although it might be assumed that it would be possible to accomplish this by the provision of a constant current power supply or a constant voltage power supply, this is not the case, as the characteristics of the ion source, ion collector and fluid, do not remain constant.

The gap characteristics are affected by the possible accumulation or deposit of dirt on the ion source or a moisture content in the fluid being measured. It would also be necessary to maintain a constant pressure in the gas being measured. However, the maintenance of constant pressure in the gas, the mass flow of which is being measured, would be a substantially incongruous requirement where the desire is to make the equipment more efficient and less complicated.

SUMMARY OF THE INVENTION

This invention is an ionizing power supply circuit in a mass flow meter which maintains the ratio of current to voltage between the ion collector and the ion source at a constant value in order to obtain a differential current output which is a true measure of mass flow in the fluid flow path and which does not require a correction by further circuitry to obtain an output signal representative of mass flow. A power supply which is linear over the appropriate range required for operation of the mass flow meter, is connected in series with an incremental power supply, which may be a conventional amplifier having a high input impedance, high gain, and low output impedance. The incremental voltage supply or amplifier is controlled by a positive feedback input proportional to the voltage across the gap between the ion source and the ion collector. In the drawings:

FIG. 1 is a combined pictorial and electrical schematic diagram of one embodiment of a mass flow meter; and FIG. 2 is a schematic pictorial and electrical diagram of another embodiment of a mass flow meter.

DESCRIPTION OF THE PREFERRED EMBODIMENT

Figure 1:
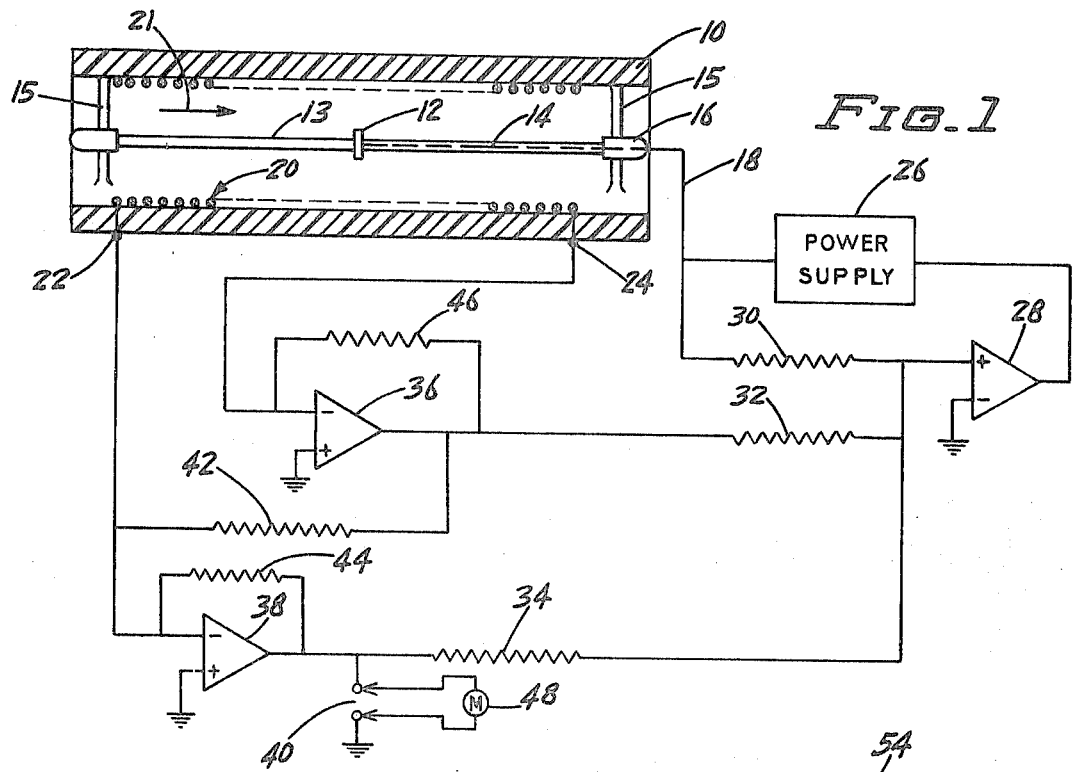

Referring now to FIG. 1, a mass flow meter is shown with a longitudinal fluid flow tube 10 and an ion source, which is a disc 12 centrally located therein on the central axis of the tube. The disc 12 is supported by a rod 13 running axially along the center of the tube. Rod 13 is in turn supported by legs 15 running to the wall of the tube 10. The disc 12 is connected by a wire 14, running axially through the rod 13 to an external connection 16. The external connection 16 is connected to a wire 18 leading to a high voltage power supply 26. Positioned along the inside wall of the tube 10 is an ion collector 20 comprised of a plurality of adjacent turns of wire running continuously from one end of the tube to the other. The ion collector can also consist of a conductive film on an insulating substrate. The ends of the ion collector are connected, respectively, to terminals 22 and 24. Terminal 22 is associated with the upstream portion of the ion collector 20 with respect to the ion source 12. A second terminal 24 is associated with the downstream end of the ion collector 20 with respect to the ion source 12. It will be appreciated that in general, the longitudinal dimension of the ion source 12 is relatively short compared to the direction of fluid flow, as indicated by arrow 21, as well as to the area of the ion collector 20.

High voltage power supply 26 has a linear voltage and current characteristic in the appropriate range of operation for the mass flow meter. An output of the high voltage supply is connected to the wire 18 leading to the ion source 12. The other output of the high voltage supply is connected to the output of linear amplifier 28 which is characterized in that it has relatively high input impedance, high gain, and low output impedance in response to incremental voltage inputs. The minus input of the amplifier is connected to the common terminal or ground of the system. The plus input of the amplifier is connected to one termination of resistors 30, 32 and 34.

The other termination of resistor 30 is connected to wire 18 leading to the ion source. Resistor 32 is connected to the output of an amplifier 36. Resistor 34 is connected to the output of an amplifier 38 and to the output termination 40 of the mass flow meter through which is received an output proportional to the mass flow variation from the reference mass flow experienced in the fluid flow path.

The minus input of the amplifier 36 is connected to terminal 24 associated with the ion collector 20. The plus input of amplifier 36 is grounded. To the output of the amplifier 36 is connected a resistor 42, the other terminal of which is connected to terminal 22 of the ion collector 20. The positive input of amplifier 38 is grounded and the minus input of amplifier 38 is connected to terminal 22 of the ion collector 20. The feedback loop around amplifier 38 is carried by resistor 44, and similarly, resistor 46 provides a feedback loop around amplifier 36. A meter 48 is provided at the output termination 40 to indicate mass flow.

Figure 2:
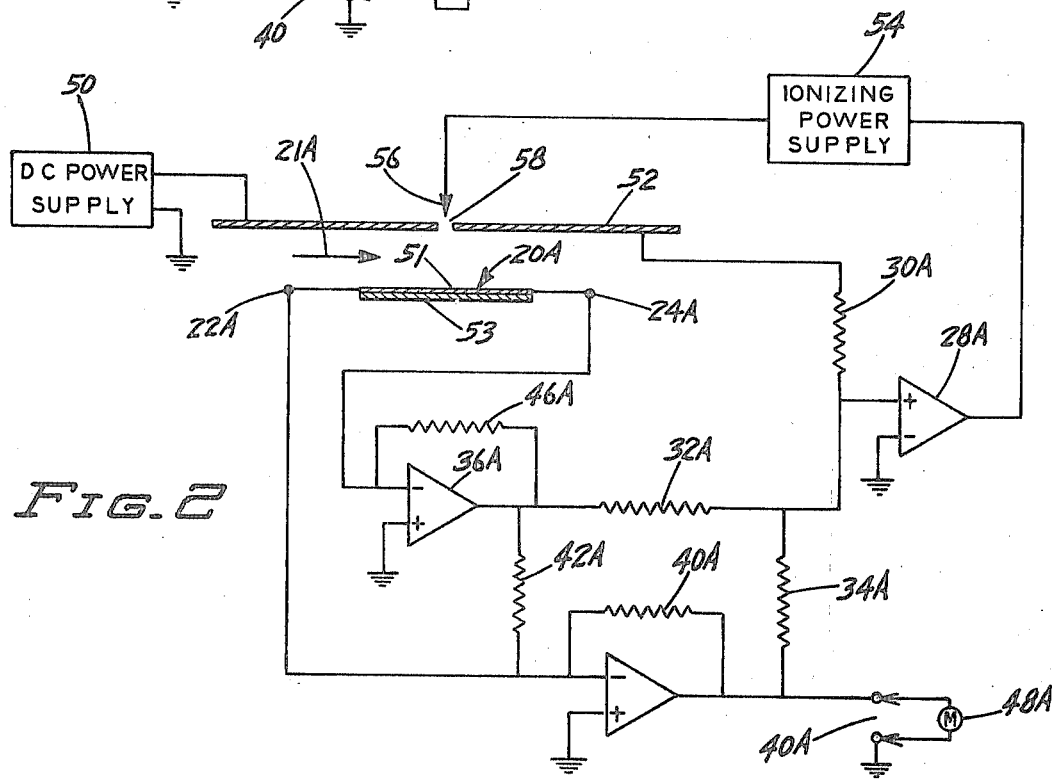

Referring now to FIG. 2, the same electronic control circuitry is provided with another arrangement of the ion source. Elements of the circuit of FIG. 2 corresponding to elements of the circuit of FIG. 1 have the same reference numerals with the suffix "A" added. A direct current high voltage power supply 50 is connected to a disc 52, in the fluid flow path, and provides a potential field between the disc and the ion collector 20A, shown as a conductive film 51 on an insulating disc-shaped substrate 53. An ionizing power supply 54 is connected to an ion source which is an ionizing probe 56 which ejects ions through a hole 58 in the disc 52. The field generated by power supply 50 between the disc 52 and the ion collector 20A propels the ions toward the ion collector 20A. Positive feedback from the disc 52 to the amplifier 28A controls the ionizing power supply 54 to maintain a constant voltage to current ratio between the ion source and the ion collector.

It will be appreciated that the current flowing through resistor 30 will be proportional to the voltage between the ion source 12 and the ion collector 20. Resistors 32 and 34 and the gain of amplifiers 36 and 38 are chosen so that the sum of the current traveling through resistors 32 and 34 to the input of amplifier 28 is proportional to the total current flowing to the ion collector 20. This current passing through resistors 32 and 34 is essentially equal and opposite to the current flowing through resistor 30. Ideally amplifier 28 draws very little current.

In operation, the mass flow meter is adjusted with a reference mass flow which is a zero mass flow, so that with an ion flow between the ion source and ion collector, the currents produced by the ion collector terminals 22 and 24 are equal. The output of the mass flow meter is the differential between the currents produced at terminals 22 and 24 and at the zero flow condition the output is zero because there is no deflection of the median ion in the area of ion impingement. The circuit values are set so that meter 48 shows no reading at zero mass flow. With the circuit calibrated, the meter 48 reads values directly proportional to the differential current flow from the ion collector terminals and provides readings directly proportional to mass flow in the fluid flow path.

The embodiments of the invention in which an exclusive property or privilege is claimed are defined as follows:

1. A mass flow meter for measuring the mass flow of fluids passing therethrough in a fluid flow path comprising:
    ionizing means located proximate the path of fluid flow,
    ion collecting means located proximate the path of fluid flow and opposite said ionizing means, said ionizing means producing a plurality of ions in the fluid stream thereabout in a deflectable distribution, said plurality of ions formed thereabout migrating toward said ion collecting means and impinging over an area thereon, said collecting means having first and second terminations, said first and second terminations adapted to produce first and second currents respectively when ions are collected, said first and second currents being produced in response to the impingement of ions on said collector as a measure of the displacement of the median ion in the impinging area in the presence of mass flow relative to the position of impingement of the median ion in the impinging area in the presence of a reference flow,
    means for maintaining an electrical potential between said ionizing means and said ion collecting means such that the ratio of voltage therebetween to current therebetween remains constant whereby the difference between said first and second currents is directly proportional to mass flow in the fluid flow path between said ionizing means and said collecting means, and
    means responsive to the difference between said first and second currents produced by said collecting means for directly measuring the displacement in the presence of mass flow of the median ion in the area of impingement of ions, whereby the displacement of the median ion in the impinging area in the presence of a given mass flow as measured relative to the position of the median ion in the impinging area in the presence of a reference flow is representative of the mass flow variation.

2. The apparatus of claim 1 wherein said potential maintaining means is comprised of a high voltage power supply, having a linear characteristic in the mass flow meter operational range, and a linear amplifier connected in series with said high voltage power supply, said amplifier having as its input positive feedback proportional to the voltage between said ionizing means and said ion collecting means, the series combinations being connected to said ionizing means.

3. The apparatus of claim 2 and further comprising a resistor connected between the input of said amplifier and said ionizing means; and wherein said means for measuring includes means for producing a current proportional to the total current collected by said ion collecting means; and wherein the input of said amplifier is connected with said current wherein said current is equal to and opposite the current flowing through said resistor.

4. The apparatus of claim 1 wherein said ionizing means is comprised of:
    a member having an aperture therein located proximate the path of fluid flow,
    a probe located at said aperture for generating ions to pass through said aperture into the fluid flow path,
    means for maintaining an electric field between said member and said ion collecting means to cause ions to flow across the fluid flow path;
    and wherein said means for maintaining an electrical potential is comprised of:
    an ionizing power supply and a linear amplifier connected in series with said ionizing power supply, the series combination being connected to said probe, said amplifier having as its input positive feedback proportional to the voltage between said member and said ion collecting means.

5. The apparatus of claim 4 and further comprising a resistor connected between the input of said amplifier and said member; and wherein said means for measuring includes means for producing a current proportional to the total current collected by said ion collecting means; and wherein the input of said amplifier is connected with said current wherein said current is equal to and opposite the current flowing in said resistor.

6. A mass flow meter for measuring the mass flow of fluids passing therethrough in a fluid flow path comprising:
    ionizing means located proximate the path of fluid flow,
    ion collecting means located proximate the path of fluid flow and opposite said ionizing means, said ionizing means producing a plurality of ions in the fluid stream thereabout in a deflectable distribution, said plurality of ions formed thereabout migrating toward said ion collecting means and impinging over an area thereon, said collecting means having first and second terminations, said first and second terminations adapted to produce first and second currents respectively when ions are collected, said first and second currents being produced in response to the impingement of ions on said collector as a measure of the displacement of the median ion in the impinging area in the presence of mass flow relative to the position of impingement of the median ion in the impinging area in the presence of a reference flow.
    means connected with said first and second terminations for producing an output signal proportional to the difference between the currents flowing in said terminations and for producing a current proportional to the sum of the currents flowing in said terminations,
    a high voltage power supply, having a linear characteristic in the mass flow meter operational range,
    a linear amplifier having a high input impedance connected in series with said high voltage power supply, the series combination of said power supply and said amplifier being connected to said ionizing means,
    a resistor connected from said ionizing means, and carrying a current proportional to the voltage between said ionizing means and said ion collecting means, to the input of said amplifier and to said current proportional to the sum of the currents flowing in said terminations, whereby said amplifier receives as its input positive feedback proportional to the voltage between said ionizing means and said collecting means so that the series combination of said amplifier and power supply maintain a constant ratio of the voltage between said ionizing means and said collecting means and the current flowing therebetween whereby said output current proportional to the difference between the currents flowing from said collecting means terminations is directly proportional to mass flow in the fluid flow path.

7. The apparatus of claim 6 wherein said ionizing means is comprised of:

a member having an aperture therein located proximate the path of fluid flow, a probe located at said aperture for generating ions to pass through said aperture into the fluid flow path, means for maintaining an electric field between said member and said ion collecting means to cause ions to flow across the fluid flow path.

* * * * *